US006060801A

United States Patent [19]

Anderson

[11] Patent Number: 6,060,801

[45] **Date of Patent: *May 9, 2000**

[54] HIGH ENERGY MAGNETIZER/ DEMAGNETIZER FOR DRILL HOUSING

[76] Inventor: Wayne Anderson, 65 Grove St., Northport, N.Y. 11729

[ * ] Notice: This patent is subject to a terminal disclaimer.

[21] Appl. No.: 09/161,851

[22] Filed: Sep. 28, 1998

[51] Int. Cl.[7] .............................. H02K 7/14; B25B 23/08

[52] U.S. Cl. .................................................. 310/50; 81/451

[58] Field of Search ........................ 310/50, 47; 335/284; 81/451, 125

[56] References Cited

U.S. PATENT DOCUMENTS

| | | | |
|---|---|---|---|
| 512,381 | 1/1894 | Keyes | 294/65.5 |
| 608,555 | 8/1898 | Nazel | 227/147 |
| 1,587,647 | 6/1926 | Hood et al. | 81/438 |
| 1,619,744 | 3/1927 | McCloskey | 7/100 |
| 2,174,327 | 9/1939 | Love | 81/451 |
| 2,260,055 | 10/1941 | Reardon | 81/451 |
| 2,300,308 | 10/1942 | Ojalvo | 81/451 |
| 2,624,223 | 1/1953 | Clark | 81/125 |
| 2,630,036 | 3/1953 | Brown | 81/125 |
| 2,653,636 | 9/1953 | Younkin | 81/451 |
| 2,666,201 | 1/1954 | Van Orden | 227/147 |
| 2,671,369 | 3/1954 | Clark | 81/125 |
| 2,671,484 | 3/1954 | Clark | 81/451 |
| 2,677,294 | 5/1954 | Clark | 81/125 |
| 2,678,578 | 5/1954 | Bonanno | 81/436 |
| 2,688,991 | 9/1954 | Doyle | 81/452 |
| 2,718,806 | 9/1955 | Clark | 81/125 |
| 2,720,804 | 10/1955 | Brown | 81/125 |
| 2,750,828 | 6/1956 | Wendling | 81/125 |
| 2,758,494 | 8/1956 | Jenkins | 81/438 |
| 2,782,822 | 2/1957 | Clark | 81/451 |
| 2,793,552 | 5/1957 | Clark | 81/125 |
| 2,834,241 | 5/1958 | Chowning | 81/125 |
| 3,007,504 | 11/1961 | Clark | 81/125 |
| 3,126,774 | 3/1964 | Carr et al. | 81/125 |
| 3,253,626 | 5/1966 | Stillwagon, Jr. et al. | 81/460 |
| 3,320,563 | 5/1967 | Clark | 335/285 |
| 3,392,767 | 7/1968 | Stillwagon, Jr. | 81/451 |
| 3,467,926 | 9/1969 | Smith | 335/284 |
| 3,630,108 | 12/1971 | Stillwagon, Jr. | 81/125 |
| 3,662,303 | 5/1972 | Arllof | 335/284 |
| 3,707,894 | 1/1973 | Stillwagon, Jr. | 81/125 |
| 3,869,945 | 3/1975 | Zerver | 81/125 |
| 3,884,282 | 5/1975 | Dobrosielski | 81/439 |
| 4,219,062 | 8/1980 | Berkman | 81/458 |
| 4,393,363 | 7/1983 | Iwasaki | 335/288 |
| 4,827,812 | 5/1989 | Markovetz | 81/439 |
| 5,000,064 | 3/1991 | McMahon | 81/24 |
| 5,038,435 | 8/1991 | Crawford et al. | 7/165 |
| 5,178,048 | 1/1993 | Matechuk | 81/125 |
| 5,210,895 | 5/1993 | Hull et al. | 7/165 |
| 5,259,277 | 11/1993 | Zurbuchen | 81/177.1 |
| 5,577,426 | 11/1996 | Eggert et al. | 81/439 |
| 5,794,497 | 8/1998 | Anderson | 81/451 |

FOREIGN PATENT DOCUMENTS

| | | |
|---|---|---|
| 869431 | 5/1961 | United Kingdom . |

*Primary Examiner*—Clayton LaBalle

*Attorney, Agent, or Firm*—Lackenbach Siegel Marzullo Aronson Greenspan, P.C.

[57] ABSTRACT

A high energy magnetizer/demagnetizer on a nonoperative portion of a housing of a power driving tool includes a magnetizer/demagnetizer body on the nonoperative portion of the power driving tool and defining a mounting axis. At least one permanent magnet is formed of a magnetized material having North and South poles defining a magnetic axis and arranged on the body of the power driving tool to permit selective placement of a magnetizable element at at least one position along the magnetic axis at a predetermined distance from one of the poles to magnetize the element and placement of the magnetizable element at a selected distance from the other of the magnetic poles greater than the predetermined distance to demagnetize the element. In this way, a magnetizable element may be initially magnetized by the magnetizer on the housing of the power driving tool by positioning same adjacent to one of the poles mounted on the nonoperative portion of the driving tool and optionally subsequently demagnetized by positioning the magnetizable element a selected distance from the other of the poles.

31 Claims, 4 Drawing Sheets

HIGH ENERGY MAGNETIZER/ DEMAGNETIZER FOR DRILL HOUSING

BACKGROUND OF THE INVENTION

1. Field of the Invention

The present invention generally relates to tools, and more specifically to a driver tool and attachment which embodies a high energy permanent magnet magnetizer and a selective demagnetizer for selectively magnetizing and/or demagnetizing a magnetizable element, such as a driver bit, fastener, and the like.

2. Description of the Prior Art

It is frequently desirable to magnetize the tips of screwdriver bits, tweezers and the like to form at a least temporary magnetic pole on the tool which attracts magnetizable elements. Thus, particularly with precision screwdrivers which tend to be relatively small and are used to drive relatively small screws, it is frequently advantageous to at least temporarily magnetize the screwdriver tips of the driver bits to maintain the screwdriver tip blade within the slot of a head of a screw or a Phillips driver within the cross slots formed within the head of the screw adapted to receive the Phillips screwdriver tip. By magnetizing the tip of the driver bit, and mating the tip within the associated opening in the head of the screw, the screw remains attached to the bit tip without the need to physically hold them together. This allows the screw to be guided through a relatively small bore or channel and moved within confined spaces. Sometimes the magnetized tip of the driver bit is used to retrieve a metal item, such as a screw, washer, nail or the like, from an inaccessible place which would otherwise be difficult to reach with anything but a relatively thin shank of a bit driver. Of course, such attachment of a fastener to the driver bit tip also frees one hand for holding or positioning the work into which the fastener is to be driven. In some instances, rather than magnetizing the tip of the driver member bit, the fastener itself is magnetized so that, again, it is attracted to and remains magnetically attached to the driver bit tip in the same way as if the latter had been magnetized.

Conversely, there are instances in which a magnetized driver bit tip is a disadvantage, because it undesirably attracts and attaches to itself various magnetizable elements or components. Under such circumstances, it may be desirable to demagnetize a driver bit tip that had been originally magnetized in order to render same magnetically neutral.

Devices for magnetizing/demagnetizing tools and small parts are well known. These normally incorporate one or more permanent magnets which create a sufficiently high magnetic field to magnetize at least a portion of a magnetizable element brought into its field. The body can be magnetized by bringing it into the magnetic field. While the magnetic properties of all materials make them respondent in some way to magnetic fields, most materials are diamagnetic or paramagnetic and show almost no response to magnetic fields. However, a magnetizable element made of a ferromagnetic material readily responds to a magnetic field and becomes, at least temporarily, magnetized when placed in such a magnetic field.

Magnetic materials are classified as soft or hard according to the ease of magnetization. Soft materials are used as devices in which change in the magnetization during operation is desirable, sometimes rapidly, as in AC generators and transformers. Hard materials are used to supply fixed fields either to act alone, as in a magnetic separator, or interact with others, as in loudspeakers, electronic instruments and test equipment.

Most magnetizers/demagnetizers include commercial magnets which are formed of either Alnico or of ceramic materials. The driver members/fasteners, on the other hand, are normally made of soft materials which are readily magnetized but more easily lose their magnetization, such as by being drawn over an iron or steel surface, subjected to a demagnetizing influence such as strong electromagnetic fields or other permanent magnetic fields, severe mechanical shock or extreme temperature variations.

One example of a stand alone magnetizer/demagnetizer is magnetizer/demagnetizer Model No. 40010, made in Germany by Wiha. This unit consists of a plastic box that has two adjacent openings defined by three spaced transverse portions. Magnets are placed within the transverse portions to provide magnetic fields in each of the two openings which are directed in substantially opposing directions. Therefore, when a magnetizable tool bit or any magnetizable component is placed within one of the openings, it becomes magnetized and when placed in the other of the openings, it becomes demagnetized. The demagnetizing window is provided with progressive steps to stepwise decrease the air gap for the demagnetizing field and, therefore, provides different levels of strengths of the demagnetizing field. However, common magnetic materials that are used with conventional magnetizers/demagnetizers include Alnico and ceramic magnets which typically have energy products equal to approximately $4.5\times10^6$ gauss-oersteds and $2.2\times10^6$ gauss-oersteds, respectively.

Since the magnetic field strength "B" at the pole of the magnet is a product of the unit field strength and the area, it follows that the energy content is proportional to the BH product of the magnet. The BH product is a quantity of importance for a permanent magnet and is probably the best single "figure of merit" or criterion for judging the quality of the permanent magnetic material. It is for this reason that conventional magnetizers/demagnetizers have required significant volumes of magnetic material to provide the desired energy content suitable for magnetizing and demagnetizing parts. However, the required volumes have rendered it impossible or impractical to incorporate the magnetizers/demagnetizers on relatively small hand tools. Thus, for example, precision screwdrivers, which are relatively small and have relatively small diameter handles, could not possibly incorporate sufficient magnetic material to provide desired levels of magnetic fields for magnetizing and demagnetizing parts. However, the requirement of using separate magnetizer/demagnetizer units has rendered their use less practical. Thus, unless the user of a precision screwdriver or any driver tool acquired a separate magnetizer/demagnetizer, one would not normally be available for use. Additionally, even if such magnetizer/demagnetizer were available, it would still require a separate component that could be misplaced and not be available when needed. Additionally, there is always the risk that the magnetizer/demagnetizer could become misplaced or lost, rendering the use of the driver tool less useful.

While the stand alone demagnetizers of the type above suggested have been mostly associated with manual drivers, such as screwdrivers, driving bits have also long been used in connection with power driving tools, such as drills. Relatively short driving bits, with flat blade and Phillips tips, are commonly used with drills and secured within a chuck to conveniently and quickly drive various fasteners. Frequently, adjustable speed drills are used for driving screws and other fasteners into surfaces or work pieces at optimum speeds in order to better maintain control of the fastener and to avoid injury to the user and damage to the fastener and to the work. Power driving tools are extremely efficient and convenient for driving fasteners at high speeds and with minimum effort on the part of the user. As such, power driving tools are used by professionals and nonprofessionals alike in connection with a wide variety of tasks. However, as with manual driving tools, it is extremely helpful to magnetize either the driving tip or the fastener being driven in order to maintain the two in engagement both to maximize the torque transmitted to the fastener as well as to prevent the stripping of the head of the fastener. Unlike with manual driving tools, which are operated at low speed, a user of a power tool cannot typically hold the fastener with one hand because of the relatively high speeds involved and the potential danger for injury to the user. Stand alone magnetizers/demagnetizers cannot be practically used in this environment since one hand normally holds the drill and the other hand is used to pick up and position the fasteners. The use of a stand alone magnetizer requires that the drill be put down every time a fastener needs to be magnetized. The present invention overcomes this problem by providing a magnetizer/demagnetizer on the power driving tool itself so the user can continue to hold the drill with one hand while the second hand can be used to initially pick up a fastener, magnetize it and then position it in engagement with the driver bit.

SUMMARY OF THE INVENTION

It is an object of the present invention to provide a high energy magnetizer/demagnetizer on a power driving tool or the like.

It is another object of the present invention to provide a magnetizer/demagnetizer as aforementioned which provides sufficiently strong magnetic fields to effectively and adequately magnetize/demagnetize a driver bit and/or a magnetizable component.

It is still another object of the present invention to provide a magnetizer/demagnetizer as in the previous objects in which the magnetizing and demagnetizing fields are created proximate to the surface of a nonoperative portion of a housing of a power driving tool.

It is yet another object of the present invention to provide a tool as in the previous objects in which the magnetizer/demagnetizer is provided with one or more openings in which the magnetizing and/or demagnetizing fields are formed for convenient and reliable magnetization and/or demagnetization.

It is a further object of the present invention to provide a magnetizer/demagnetizer as in the previous object that can be incorporated in original equipment (OEM) or can be an add-on to existing power driving tools.

It is still a further object of the present invention to provide a magnetizer/demagnetizer as in the previous object that is simple and convenient to mount or attach to an existing drill housing.

It is yet a further object of the present invention to provide a magnetizer/demagnetizer which uses a permanent magnetic material having an energy product equal to at least $7.0\times10^6$ gauss-oersteds.

In order to achieve the above objects, as well as others which will become apparent hereinafter, a high energy magnetizer/demagnetizer on a nonoperative portion of a housing of a power driving tool comprises a magnetizer/demagnetizer body on the nonoperative portion of the driving tool and defining a mounting axis. At least one permanent magnet is formed of a magnetized material having North and South poles defining a magnetic axis is arranged on said body of the power driving tool to permit selective placement of a magnetizable element at at least one position along said magnetic axis at a predetermined distance from one of said poles to magnetize the element and placement of the magnetizable element at a selected distance from the other of said magnetic poles greater than said predetermined distance to demagnetize the element. In this way, a magnetizable element may be initially magnetized by the magnetizer on the housing of the power driving tool by positioning same adjacent to one of said poles mounted on the nonoperative portion of the driving tool and optionally subsequently demagnetized by positioning the magnetizable element at a selected distance from the other of said poles.

Said at least one magnet has an energy product equal to $6.0\times10^6$ gauss-oersteds. The high energy magnetizer/demagnetizer body may be at least partially embedded in the nonoperative portion of the housing or may be attached or secured to an exterior surface of such nonoperative portion of the housing.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of preferred embodiments in which.

DESCRIPTION OF THE PREFERRED EMBODIMENTS

Figure 1:
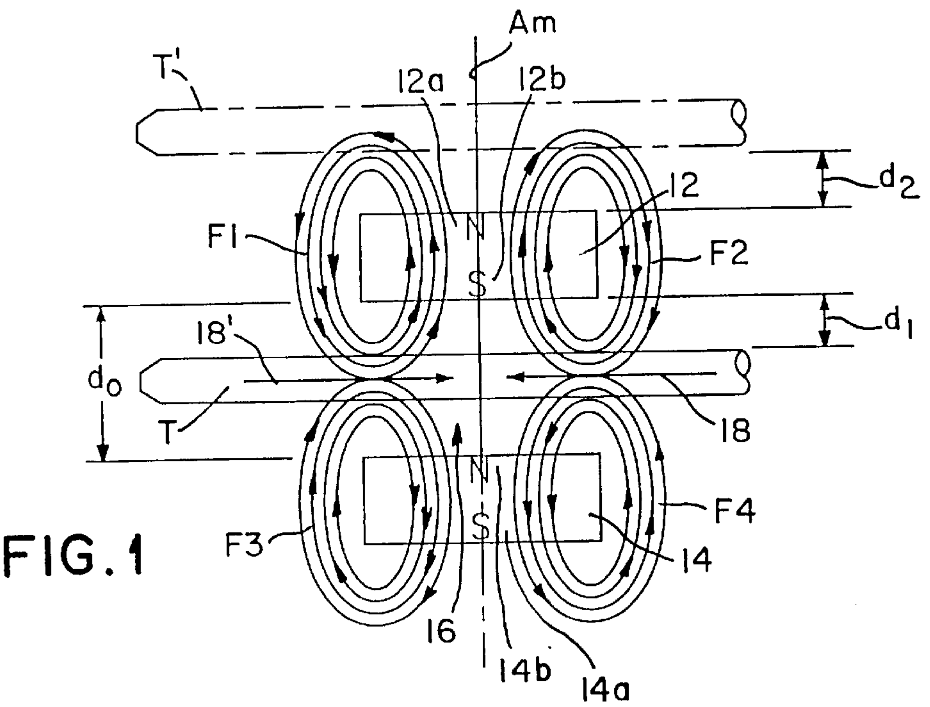
FIG. 1 is a schematic representation of the magnetic fields in the vicinity of two spaced magnets generally aligned along their magnetic axes, and showing a shank of a driver tool, such as a screwdriver shank, passed through the space between the magnets, in solid outline, to magnetize the shank, and also showing, in dashed outline, the same driver shank positioned adjacent to an opposite the pole, to demagnetize the shank.

Referring now specifically to the Figs., in which identical or similar parts are designated by the same reference numerals throughout, and first referring to FIG. 1, an arrangement of magnets to be used to achieve the objects of the present invention is generally designated by the reference numeral 10. The arrangement includes two spaced magnets 12, 14 spaced from each other a distance $d_0$ such that the magnetic poles of the two magnets are generally aligned with each other along a magnetic axis $A_m$. In FIG. 1, the poles facing each other are the same or similar poles, in the example shown these being south poles "S". Because similar poles of magnets repel each other, it will be evident that the resulting magnetic fields surrounding these magnets will be as depicted in FIG. 1, fields F1 and F2 being diametrically opposing cross sections of a generally continuous field in the shape of a torus surrounding the upper magnet 12 and symmetrically arranged about the magnetic axis $A_m$. Similarly, fields F3 and F4 are cross sectional images of a correspondingly shaped toroidal field symmetrically arranged about the magnetic axis $A_m$ in relation to the lower magnet 14. In the presently preferred embodiments, the magnets 12, 14 are "pill" magnets in the shape of circular cylindrical discs, the axes of symmetry of which coincide along the magnetic axis $A_m$. However, it will be evident to those skilled in the art that the specific shapes of the "cylinders" are not critical and discs having configurations other than circular discs may be used, with different degrees of advantage.

The spaced magnets 12, 14 create a region 16 between these magnets in which the upper and lower fields reinforce each other in the region 16 to produce magnetic components 18, 18' that are radially inwardly directed at diametrically opposite sides of the fields, as shown in FIG. 1. It will be evident, therefore, that a tool T inserted into the space 16 will experience localized fields that are significantly stronger than the fields generated by either one of the magnets and will be roughly twice the strength of the fields generated by either one of the magnets. Additionally, while the idealized representation in FIG. 1 suggests that the magnetic field will be enhanced or magnified only about the peripheries of magnets 12, 14, it will also be evident that an enhanced field will also be generated throughout the space 16.

With a field configuration as depicted in FIG. 1, it will be evident that the insertion of an elongate shank "T" of a driver, such as a screwdriver, drill bit, etc., into the space 16 will experience field reversals as the shank is introduced radially, in relation to the axis $A_m$, from one side of the magnets, through the axis $A_m$ and ultimately out through the diametrically opposite side. In the example illustrated, if a screwdriver is initially inserted from the right-hand side, as viewed in FIG. 1, the tip portion T1 of the driver shank T will initially experience the component 18 which is directed toward the left. As that portion T1 of the shank approaches the magnetic axis $A_m$ (at T2), the magnetic field is relatively neutral, or virtually nonexistent. When the portion T1 of the tool shank passes towards the left through the fields F1 and F3 it will experience a magnetic component 18' and generally directed towards the right. At the same time, an upstream portion T3 of the shank, passing through the fields F2, F4 will experience the component 18 toward the left. If the shank T does not proceed further towards the right than illustrated in FIG. 1, there will be upstream portions of the shank, beyond T3, that will not experience the strong magnetic forces created by the magnets 12, 14. As a result of the reversals of the directions of the magnetic fields by the components 18, 18', it will be evident that different portions of the shank T will initially be magnetized in one direction and be subsequently magnetized in an opposing direction. Such reversals in magnetization will continue as the shank T moves through the composite field towards the left when the tool is initially introduced between the magnets, and ultimately moved towards the right when the tool is withdrawn from the space 16. It will also be evident that although the tip T1 of the shank T will initially be magnetized when it is introduced into the space 16 from the right, it will also be the last portion of the shank T to be magnetically altered as it is the last portion to be withdrawn from the space 16 as the tool shank T is moved towards the right.

As will be more fully discussed in connection with FIG. 8, since the magnetic components 18, 18' are extremely strong, the last magnetic component that acts on any portion of the shank will demagnetize any previously magnetized portion and may, depending on the parameters, remagnetize that magnetizable portion consistent with the directions of the magnetic components. In FIG. 1, since the magnetic component 18 is the last component to be experienced by the tip T1 of the driver shank, the removal of that tip portion from the space 16 by movement of the shank towards the right will cause the magnetic component 18 to magnetize the tip T1 with a north pole "N". Therefore, the strong magnetic field within the space 16 will strongly magnetize the tip T1 of the shank T. To demagnetize the tip, when desired or necessary, requires that the tip T1 of the shank be placed within a field in which the field lines are reversed within the tip portion so that the field lines enter instead of leave the tip portion. This can be done by swiping or passing the tip portion T' across an opposite pole, here along the north pole "N" of the upper magnet 12. When the shank T is swiped adjacent the north pole N, as illustrated in dashed outline at T', and the shank is moved from left to right, it will be evident that the upper part of the field F2 will flow in the desired direction within the tip of the driver to effectively demagnetize that tip, in whole or in part, or remagnetize it with an opposing polarity. For reasons which will be more fully discussed in connection with FIG. 8, one feature of the present invention consists of the relative spacings $d_1$, $d_2$ of the driver shank from the initial magnetizing pole "S" and from the demagnetizing pole "N", respectively, such that magnetization of the tool will be assured and efficient, while demagnetization will be substantially complete while avoiding remagnetization with an opposing polarity. As will be evident from the discussion of FIG. 8, the magnetic force required to magnetize a magnetizable material is significantly greater than the magnetic force required to demagnetize that material. A feature of the invention, therefore, is the arrangement of the magnet or magnets in such a way that will position the shank T of the tool to be magnetized closer to the magnetizing pole face than to the demagnetizing pole face. In FIG. 1, this can be established by selecting the distance $d_1$ to be smaller than the distance $d_2$. While the specific distances $d_1$ and $d_2$ are not critical, they should be selected to generally correspond to the magnetizing and demagnetizing forces required to magnetize and demagnetize a specific tool shank T, this being a function both of the size of the shank as well as the specific material from which it is made. The material is important because, as will be evident from FIG. 8, different materials exhibit different magnetic properties, requiring different magnetic intensities or magnetizing forces to produce the same magnitudes of magnetic field or magnetic flux. The dimensions of the material to be magnetized is also important, because the more volume that the tool shank exhibits, the greater the magnetic field that will be required since what is instrumental in magnetizing or demagnetizing the material is not only the absolute intensity of the magnetic field but also the relative density of the field taken across a given cross sectional area of the tool or magnetizable material. In the case of the shank of a screwdriver, for example, the larger the diameter of the shank, the smaller the relative density of the magnetic field for a given amount of available magnetic flux. Therefore, in order to magnetize or demagnetize magnetic materials that are not saturated generally requires magnetic field levels consistent with the geometric dimensions of the shanks.

Figure 1A:
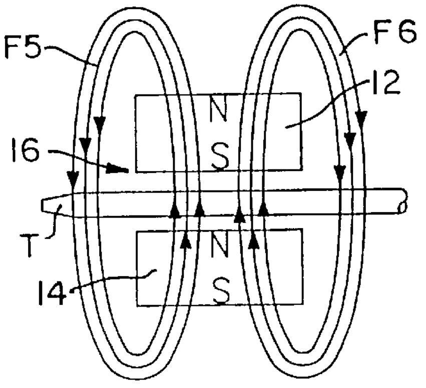
FIG. 1A is generally similar to FIG. 1, but showing a schematic representation of the magnetic fields when the two spaced magnets have their opposing poles facing each other.

In FIG. 1A, a different field configuration is established in the space 16. By flipping the magnet 14 around by 180°, the positions of the poles "N" and "S" are reversed, so that opposite poles now face each other across the gap of the space 16. Since the facing poles now attract, an enlarged field is formed including diametrically opposite sections F5, F6 of a toroidal field symmetrically arranged about the magnetic axis $A_m$. It will be clear that the field components that pass through the tool shank T are essentially perpendicular to the shank instead of being parallel as in FIG. 1. While there will be a number of field reversals as the shank T passes through the space 16, as viewed in FIG. 1A, the magnitude and orientations of the field have less of a magnetizing influence on the tool shank, and the arrangement is less effective than the arrangement shown in FIG. 1.

Figure 1B:
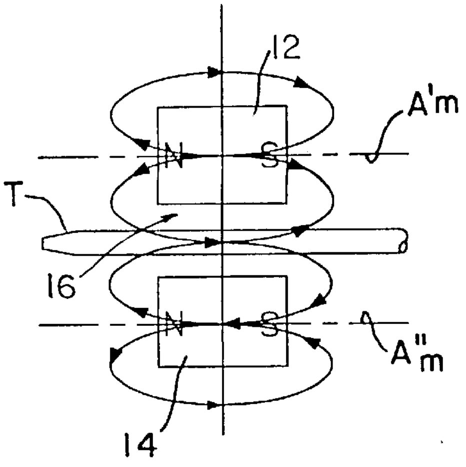
FIG. 1B is an alternative arrangement of the two spaced magnets in which similar poles face the same directions and the two magnetic axes are spaced but substantially parallel to each other.

In FIG. 1B, the two magnets 12, 14 are arranged so that their magnetic axes $A_m'$, $A_m''$ are parallel but offset from each other. The resulting field is similar in some respects to the field shown in FIG. 1, in which each magnet generates its own magnetic field, both fields reinforcing each other in the space 16 through which the tool shank T is passed. However, the field does not reverse as the shank passes through the space and continues to magnetize the shank in the same sense or polarity both when inserted as well as when withdrawn from the space 16. While the embodiment shown in FIG. 1 has been found to be most effective, the embodiments shown in FIGS. 1A and 1B may be used with different degrees of advantage.

Figure 2:
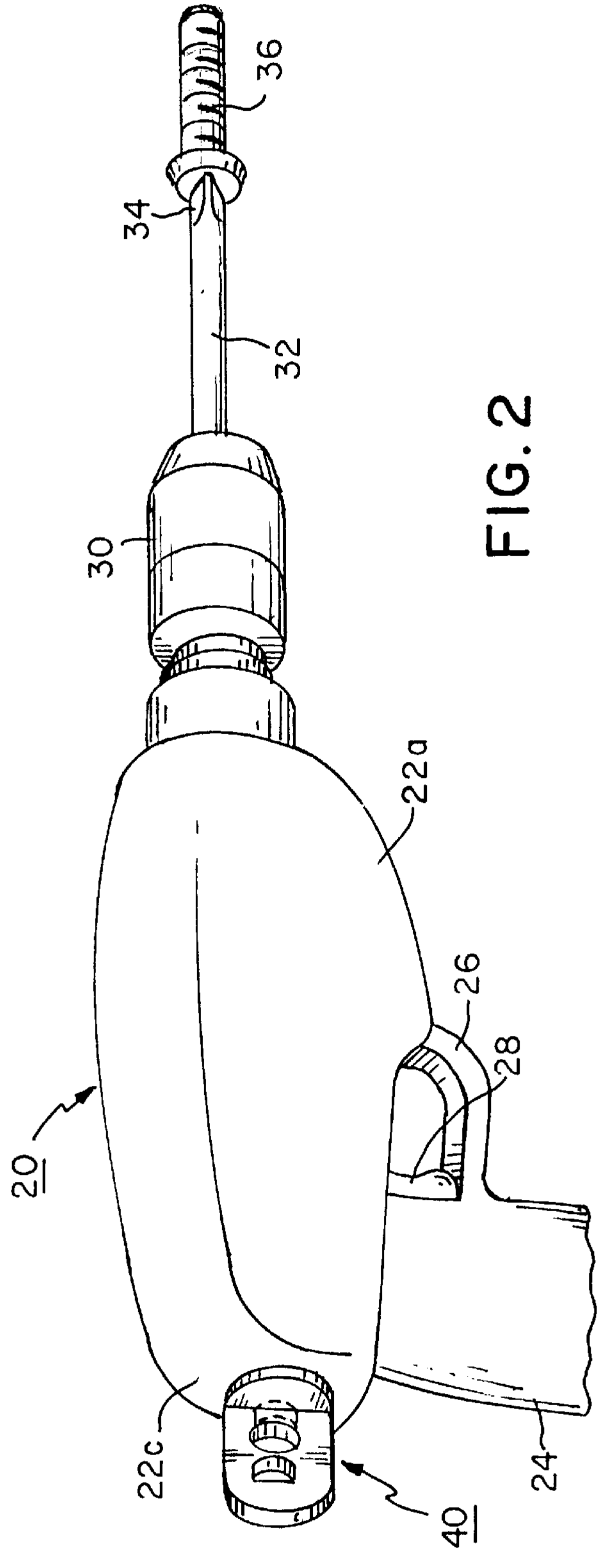
FIG. 2 is a perspective view of a portable power drill, illustrating a high energy magnetizer/demagnetizer attached to a surface of a rear portion of the drill housing, and also illustrating a Phillips screw magnetically attached to a Phillips driver tip.

In FIG. 2 a power driving tool in the form of a portable power drill is generally illustrated by the reference numeral 20. The drill 20 has a motor/drill housing 22 which defines various exterior surfaces, including side surfaces 22*a*, top surface 22*b* and rear or end surface 22*c*. The drill 20, which is of conventional design, includes a handgrip 24, a finger guard 26 and a trigger switch 28. At the remote end of the housing 22 there is provided a chuck 30 which is suitable for gripping and securing the shaft or shank of a driver bit 32 provided at the remote or free end with a suitable driving tip 34. A Phillips driving tip 34 is shown in FIG. 2 engaged with a Phillips head screw or fastener 36.

In accordance with the present invention, a high energy magnetizer/demagnetizer is provided on a nonoperative portion of the housing 22 of the power drill, being generally designated in FIG. 2 by the reference numeral 40. A "nonoperative portion" of a power driving tool or the like is defined, for purposes of the present invention, to mean a portion of the power driving tool or other device which is not critical to the proper functioning or operation of the driving tool or other device so that the driving tool or other device can continued to be used in accordance with its intended function notwithstanding the fact that the magnetizer/demagnetizer is integrally formed thereon or attached thereto. Stated otherwise, making the magnetizer/demagnetizer integral with or attaching it to the non-operative portion of the driving tool or other device does not materially affect or diminish its operation or usefulness.

Figure 3:
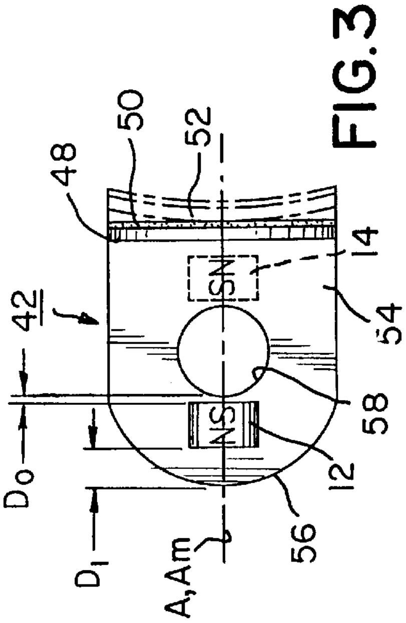
FIG. 3 is a side elevational view of the magnetizer/demagnetizer shown in FIG. 2, also illustrating, in phantom outline, a curved or arcuate mounting member that can be used with a correspondingly shaped surface of a nonoperative portion of a power driving tool housing.
Figure 4:
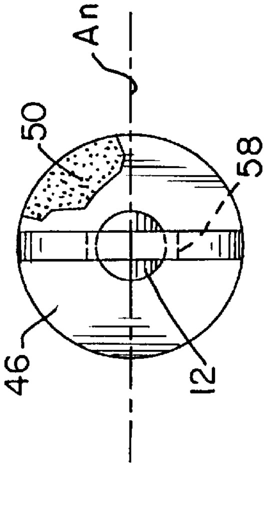
FIG. 4 is a rear elevational view of the magnetizer/demagnetizer shown in FIG. 3, partially broken away to illustrate an adhesive layer provided on the exposed surface of the flat mounting member.

Referring more specifically to FIGS. 3 and 4, the magnetizer/demagnetizer 40 includes a body 42 which defines a mounting axis AAt least one permanent magnet 12, formed of a magnetized material having North and South poles, defines a magnetic axis $A_m$ which, in the embodiment shown, coincides with the mounting axis A. The body 42 is arranged on the housing as shown to permit selective placement of a magnetizable element, such as the Phillips head screw or fastener 36, at at least one position along the magnetic axis $A_m$ at a predetermined distance $d_0$ from the pole (here, the south pole "S") of the magnet 12 to magnetize the fastener. In the instance where a magnetizable element, such as the driving tip 34, needs to be demagnetized, the body 42 is arranged to facilitate placement of the magnetizable element a selected distance $d_1$ from the other of the magnetic poles (here, the north pole "N"), where the distance $d_1$ is greater than the distance $d_0$ to demagnetize the element. In this way, a magnetizable element, such as a fastener 36, may be initially magnetized by the magnetizer 40 on the housing 22 of the power driving tool by positioning the fastener adjacent to one of the poles "S" mounted on the nonoperative portion of the driving tool. Since the fastener 36 is normally driven into a surface, where it remains, it is normally not necessary to demagnetize such fastener. However, if other driving bits or components need to be demagnetized after being magnetized, they can, as suggested, be demagnetized by placing same adjacent to the other of the poles "N".

In accordance with the above definition of nonoperative portion, the magnetizer/demagnetizer 40 need not be placed on the rear or end surface 22*c* as shown. Instead, it may be attached to any convenient surface of the housing 22, such as along the top surface 22*b*, the side surface 22*a* or any other surface which would not interfere with the user's handling or use of the power tool 20.

In FIGS. 3 and 4, the magnetizer/demagnetizer 40 is shown to include a substantially flat mounting member 46 which is provided on an exposed surface thereof 48 with suitable attachment means such as a strip of adhesive or a strip of adhesive tape 50. The mounting member 46 may also assume a different shape/configuration to facilitate mounting on a non-flat surface, as suggested by the arcuate or curved mounting member 52 shown in phantom outline in FIG. 3. Extending rearwardly from the flat mounting member 46 is a magnet carrier member 54 which may be provided at the proximate end with an arcuate surface or edge 56. In this embodiment, both the mounting member 46 as well as the magnet carrier member 54 are formed of substantially flat stock and are arranged perpendicularly to each other, as shown.

The magnet carrier member 54 is provided with a hole sufficiently large to receive a magnetizable element to be magnetized. At least one permanent magnet 12 is arranged adjacent to the hole 58 to position a pole of the magnet 12 in proximity to the magnetizable element when passed through the hole. While one permanent magnet 12 may be used, it is also possible to use two permanent magnets, as suggested by the optional magnet 14, shown in phantom outline.

While the hole 58 is shown in FIG. 3 to be generally aligned with the mounting axis A, it should be evident that this hole need not be so aligned and may be moved upwardly or downwardly in relation to the mounting axis without adversely affecting the use or operation of the magnetizer/demagnetizer. However, where two magnets are used, they are preferably arranged on diametrically opposite sides of the hole 58 so that their magnetic axes are substantially aligned or coextensive with each other.

By providing an arcuate surface 56, as shown in FIG. 3, it will be clear that a magnetized fastener or other component to be demagnetized may be placed at variable distances from the demagnetizing pole to regulate the level of demagnetization, as more fully described in applicant's copending patent application for Wayne Anderson, "High Energy Magnetizer and Selective Demagnetizer Integral with Driver Tool or the Like," filed Sep. 28, 1998 (serial number not yet assigned; Attorney Docket No.: P-10D). Also, while the magnets are illustrated in FIG. 3 to have facing poles of the same polarities, it is clear from the discussion of FIGS. 1, 1A and 1B that permanent magnets may be variably arranged, while obtaining many of the benefits of the present invention with different degrees of advantage. Optimum magnetization is, however, obtained with the embodiment suggested in FIG. 1, in which the facing poles are of the same polarity.

The body 42 forming the magnetic carrier member 54 is made of a nonmagnetic material, such as plastic or rubber or other nonmagnetic material. This ensures that the body 42 itself does not interfere or modify or reduce the fields generated by the magnets 12, 14.

The magnets 12, 14 preferably have a "disk" or "pill" shape and are relatively small relative to the dimensions of the body 42, in order to reduce the cost as well as the weight of the magnetizer/demagnetizer. In FIG. 3 the diameters of the magnets are shown to be less than the diameter of the hole 58. However, the use of larger magnets would not detract from the operation, but only the efficiency and cost of use.

Figure 5:
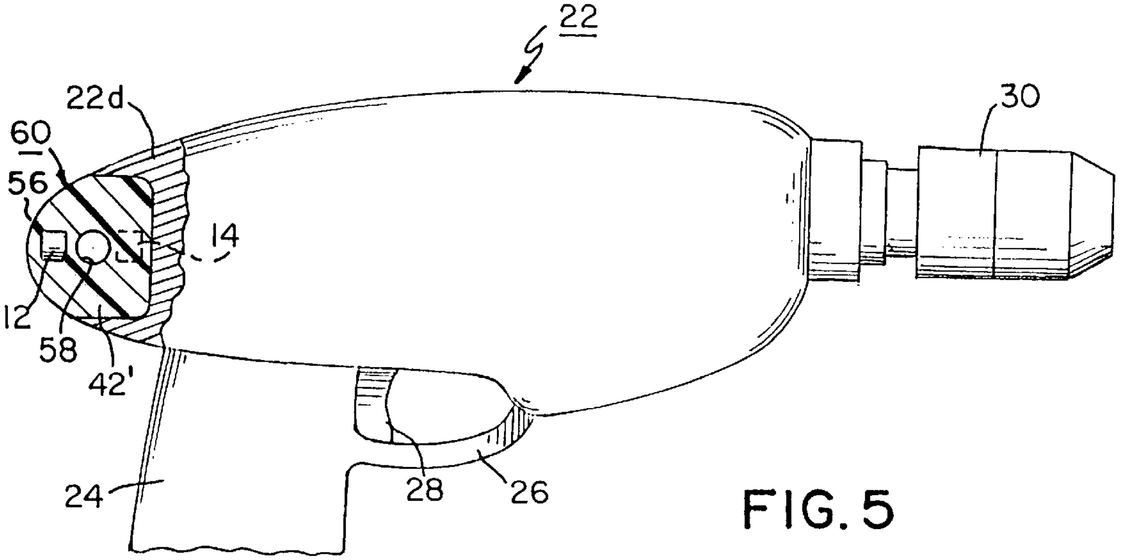
FIG. 5 is a side elevational view of a portable power drill similar to FIG. 2, partially broken away to illustrate a variant embodiment of the magnetizer/demagnetizer which is at least partially embedded within the nonoperative portion of the drill housing.

Referring to FIG. 5, a variant embodiment of the invention is shown in which a body 42' is at least partially embedded within the rear portion of the housing **22*d*. In this FIG., the housing is shown to be formed of a metal casing, while the body 42' is formed of a nonmetallic material, such as plastic or rubber, for reasons aforementioned. Aside from being embedded within the housing, as opposed to being surface mounted, the magnetizer/demagnetizer shown in FIG. 5 operates in the same way and provides the same benefits and advantages as the unit 40 shown in FIGS. 1–4**.

Figure 6:
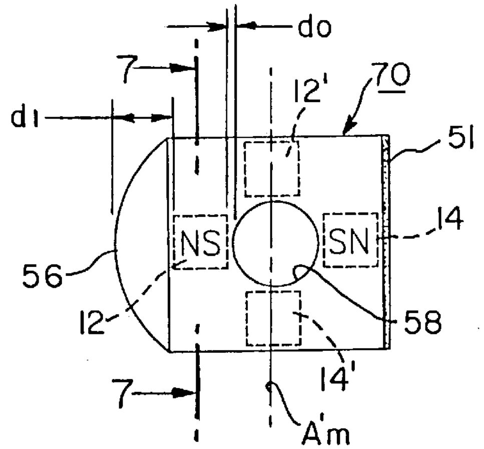
FIG. 6 is a side elevational view of a magnetizer/demagnetizer similar to the one illustrated in FIG. 5, which is suitable to be either embedded within a drill housing or mounted on an exterior surface of such housing.
Figure 7:
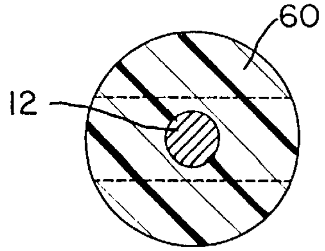
FIG. 7 is a cross sectional view of the magnetizer/demagnetizer shown in FIG. 6, taken along line 7—7.

In FIGS. 6 and 7 a further embodiment of the magnetizer/demagnetizer is shown and designated by the reference 70. The body 70 is cylindrical in shape with a substantially uniform circular cross section, the mounting axis A being coextensive with the geometrical axis of the body. The body 70 is provided a convex surface 56 at one axial end of the body. The unit 70 may be either surface mounted, by means of a glue strip or other adhesive material 51, or may be embedded, as suggested in FIG. 5, within the body of the housing. In the embodiments illustrated, the hole 58 is formed within the bodies of the magnetizers/demagnetizers along a direction transverse to the mounting axis A.

While the magnetic axes $A_m$ of the magnets 12, 14 are shown aligned with the mounting axis A in FIG. 6, as was the case with the embodiment of FIG. 3, alternate positions of the magnets 12', 14' are shown in FIG. 6 in which the magnets have been rotated or displaced 90° from the mounting axis A. Clearly, the magnetizer could be used in the same way to magnetize fasteners.

It will be evident, therefore, that there are many possible arrangements of magnets in order to practice the present invention. The specific locations of the magnets on the handle are not critical, and one single magnet or two spaced magnets may be used. However, in order to effectively practice the present invention, it is required or highly desirable that the magnetic materials used have a relatively high energy product and that the magnetizable components can at least be positioned at or proximate to the magnetic axes of the magnets.

An important feature of the present invention is the provision of magnetic means on the drill housing for establishing a magnetizing magnetic field accessible for selective placement of a magnetizable element within the field, with the magnetic means being formed by a permanently magnetized material having an energy product sufficiently high so that the size and volume of the permanent magnet can be made sufficiently small so that it can be mounted on or embedded within conventionally sized drill housings. Since the magnetic energy content, or BH product, of a magnetic material is proportional to the volume of the magnet, it has been determined that in order to use permanent magnets with small volumes to be mountable on driver tool handles, the magnetic properties of the permanent magnet materials must be equal to at least $7.0\times10^6$ gaussoersteds. Magnetic flux lines conventionally leave the North Pole and enter the South Pole, the magnetic flux lines being always closed curves that leave the North Pole and enter the South Pole and always maintain the same direction. Therefore, magnetic flux lines generally exhibit the same directions at both Pole surfaces, with the exception that the flux lines leave from the North Pole and enter into the South Pole. The placement of a soft magnetizable material proximate to either of the polar surfaces, therefore, has the same effect on the magnetic domains of the magnetizable material and would tend to either magnetize or demagnetize the magnetizable material at each of the poles. Since both poles have the same effect on a magnetizable element, it is generally necessary to have at least two permanent magnets which are so arranged so as to provide oppositely directed magnetic fields in order to establish reverse polarizing effects on the magnetizable element. Thus, if one of the magnetic poles of one of the permanent magnets provides a magnetizing effect, the other permanent magnet is preferably so arranged so that the placement of the magnetizable element next to one of its poles will have an opposite or demagnetizing effect.

Because conventional magnetic materials that have been used in the past for magnetizing and demagnetizing have had relatively low energy products BH, they could not be embedded or mounted on conventional driver tool handles. Even when attempts to do so have been made, only single bulky and weak magnets could be provided which would normally serve to magnetize components. However, in accordance with the present invention, two or more magnets can now be easily mounted and/or embedded within conventional portable drill housings to provide strong magnetizing and demagnetizing fields.

Figure 8:
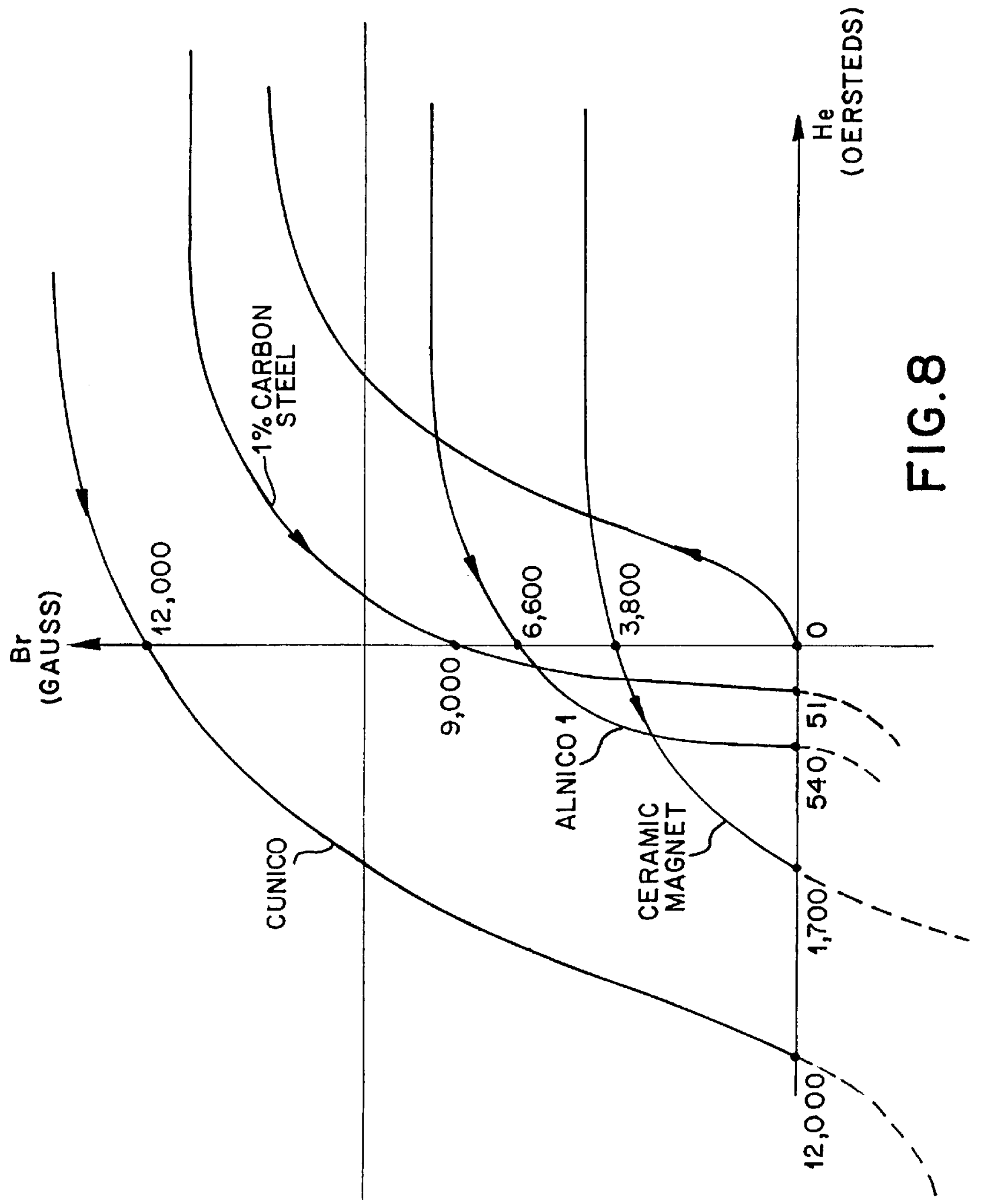
FIG. 8 illustrates partial magnetization curves for some typical or representative magnetizable materials, illustrating the magnetizing force required to initially saturate the magnetic materials and, subsequently, to demagnetize such materials.

Referring to FIG. 8, typical BH curves are illustrated for different magnetizable materials. In each case, with the magnetizable material initially totally demagnetized, the curve M illustrates initial magnetization from the origin, such that as the magnetic intensity H is increased, the flux levels within the materials B are correspondingly increased. While initially such relationship may be relatively linear, magnetic materials saturate at a predetermined level such that increases in magnetic intensity H do not result in additional flux being generated. The remaining curves D1, D2, D3 and D4 illustrate the demagnetizing portions of the B-H curves for different magnetizable materials, namely, cunico, 1% carbon steel, alnico and ceramic magnets. It will be evident that these materials not only have different retentive values $B_r$(at H=0) but also require different amounts of reverse magnetization in order to totally demagnetize these materials or revert these to the totally demagnetized states in which B=0. Thus, cunico has a retentive field of 12,000 gauss when demagnetizing force is removed and requires −12,000 oersteds to totally demagnetize the material. One-percent carbon steel has a retentive magnetic field of 9,000 gauss when the magnetic intensity is removed, and requires only −51 oersteds to totally demagnetize such steel. Alnico has a somewhat lower retentive field of 6600 gauss, while requiring −540 oersteds to demagnetize the alnico, while a typical ceramic magnet has the lowest retentive field when magnetic intensity is removed, namely 3800 gauss, while a negative intensity of 1700 oersteds is required to demagnetize this material. Therefore, particularly for 1% carbon steel, alnico and ceramic magnets, it will be evident that the reverse magnetic intensities required to fully demagnetize these materials are relative low and substantially less than the intensities required to saturate and fully magnetize these materials. It is for this reason that the distances $d_1$ in each of the embodiments illustrated was selected to be less than the demagnetizing distances $d_2$.

While this invention has been described in detail with particular reference to preferred embodiments thereof, it will be understood that variations and modifications will be effected within the spirit and scope of the invention as described herein and as defined in the appended claims.

What I claim is:

1. A high energy magnetizer/demagnetizer on a nonoperative portion of a housing of a power driving tool, comprising a magnetizer/demagnetizer body on the nonoperative portion of the power driving tool and defining a mounting axis; and at least one permanent magnet formed of a magnetized material having north and south poles defining a magnetic axis and arranged on said body of the power driving tool to permit selective placement of a magnetizable element at at least one position along said magnetic axis at a predetermined distance from one of said poles to magnetize the element and placement of the magnetizable element at a selected distance from the other of said magnetic poles greater than said predetermined distance to demagnetize the element, whereby a magnetizable element may be initially magnetized by the magnetizer on the housing of the power driving tool by positioning same adjacent to one of said poles mounted on the nonoperative portion of the driving tool and optionally subsequently demagnetized by positioning the magnetizable element at a selected distance from the other of said poles.

2. A high energy magnetizer/demagnetizer as defined in claim 1, wherein said at least one magnet has an energy product equal to at least $7.0\times10^6$ gauss-oersteds.

3. A high energy magnetizer/demagnetizer as defined in claim 1, wherein one permanent magnet is provided.

4. A high energy magnetizer/demagnetizer as defined in claim 1, wherein two permanent magnets are provided.

5. A high energy magnetizer/demagnetizer as defined in claim 1, wherein the operative portion comprises a portion of said body provided with a hole sufficiently large to receive a magnetizable element to be magnetized, said at least one permanent magnet being arranged adjacent to said hole to position said one of said poles in proximity to the magnetizable element when passed through said hole.

6. A high energy magnetizer/demagnetizer as defined in claim 5, wherein said hole is generally aligned with said mounting axis.

7. A high energy magnetizer/demagnetizer as defined in claim 6, wherein said magnetic axis is offset by 90° from said mounting axis.

8. A high energy magnetizer/demagnetizer as defined in claim 5, wherein two magnets are arranged on diametrically opposite sides of said hole.

9. A high energy magnetizer/demagnetizer as defined in claim 6, wherein said magnetic axis is generally aligned with said mounting axis.

10. A high energy magnetizer/demagnetizer as defined in claim 9, wherein said body has an external configuration to form a plurality of selectable demagnetizing distances with the demagnetizing pole surface.

11. A high energy magnetizer/demagnetizer as defined in claim 1, wherein said body is at least partially embedded in said nonoperative portion of said housing.

12. A high energy magnetizer/demagnetizer as defined in claim 8 wherein said two spaced permanent magnets have facing pole surfaces of the same polarities.

13. A high energy magnetizer/demagnetizer as defined in claim 8, wherein said two spaced permanent magnets have aligned magnetic axes and have facing pole surfaces of opposite polarities.

14. A high energy magnetizer/demagnetizer as defined in claim 1, wherein said body is mounted on an external surface of the nonoperative portion of the housing.

15. A high energy magnetizer/demagnetizer as defined in claim 14, wherein said body is attached to said external surface by means of adhesive.

16. A high energy magnetizer/demagnetizer as defined in claim 14, wherein said body is attached to said external surface by means of adhesive tape.

17. A high energy magnetizer/demagnetizer as defined in claim 1, wherein said body is made of a nonmagnetic material.

18. A high energy magnetizer/demagnetizer as defined in claim 17, wherein said nonmagnetic material is plastic.

19. A high energy magnetizer/demagnetizer as defined in claim 17, wherein said nonmagnetic material is rubber.

20. A high energy magnetizer/demagnetizer as defined in claim 5, wherein the diameter of said hole is greater than the diameter of said at least one magnet.

21. A high energy magnetizer/demagnetizer as defined in claim 5, wherein said magnetizer/demagnetizer body is cylindrical in shape with a substantially uniform circular cross section, the mounting axis being coextensive with the geometrical axis of said body.

22. A high energy magnetizer/demagnetizer as defined in claim 21, wherein said body is provided with a convex surface at one axial end of said body.

23. A high energy magnetizer/demagnetizer as defined in claim 5, wherein said hole is formed within said body along a direction transverse to said mounting axis.

24. A high energy magnetizer/demagnetizer as defined in claim 1, wherein said body has a mounting surface which is curved to enable said body to be mounted on a curved surface of the nonoperative portion of the housing.

25. A high energy magnetizer/demagnetizer as defined in claim 1, wherein said body has a mounting surface which is flat or planar to enable said body to be mounted on a substantially flat surface of the nonoperative portion of the housing.

26. A high energy magnetizer/demagnetizer as defined in claim 1, wherein said body comprises a mounting member having opposing sides and configured to correspond to the shape of the surface of the nonoperative portion of the housing on which said body is to be mounted; and a magnet carrier member extending from one side of said mounting member; and attachment means for attaching the other side of said mounting member to the housing.

27. A high energy magnetizer/demagnetizer as defined in claim 26, wherein said attachment means comprises a layer of adhesive tape on said mounting surface.

28. A high energy magnetizer/demagnetizer as defined in claim 26, wherein said attachment means comprises adhesive tape.

29. A high energy magnetizer/demagnetizer as defined in claim 26, wherein said mounting and carrier members are arranged in substantially orthogonal planes.

30. A high energy magnetizer/demagnetizer as defined in claim 29, wherein said carrier member is provided with a hole sufficiently large to receive a magnetizable element to be magnetized, said at least one permanent magnet being arranged adjacent to said hole to position said one of said poles in proximty to the magnetizable element when passed through said hole.

31. A high energy magnetizer/demagnetizer as defined in claim 30, wherein two magnets are arranged on diametrically opposite sides of said hole.

* * * * *